June 14, 1960 R. E. KEMELHOR 2,940,749
FLUID MAGNETIC SPRING, DAMPER AND LOCKOUT DEVICE
Filed Nov. 2, 1959
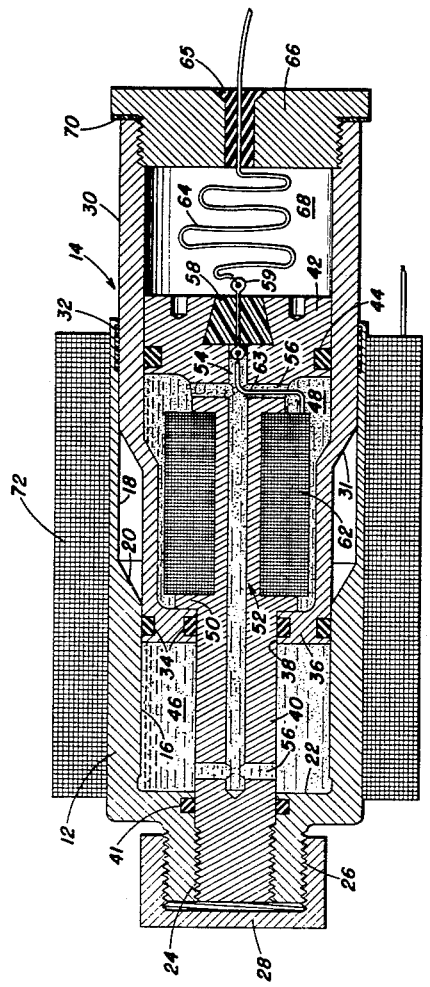
ROBERT E. KEMELHOR
INVENTOR.

United States Patent Office 2,940,749
Patented June 14, 1960

2,940,749

FLUID MAGNETIC SPRING, DAMPER, AND LOCKOUT DEVICE

Robert E. Kemelhor, 6211 Redwing Court, Bethesda, Md.

Filed Nov. 2, 1959, Ser. No. 850,293

4 Claims. (Cl. 267—1)

This invention relates to a unitary mechanism which combines the features of a liquid spring, a shock absorber and a lockout device. More particularly, the present invention relates to such a mechanism having a variable spring constant, a variable damping coefficient and also a characteristic enabling provision for solid mounting.

It is often desirable to provide a resilient or shock mounting for a piece of equipment and yet still be able, when deemed necessary, to provide a solid mount therefor. This is done conventionally by use of a spring or shock absorber in conjunction with a mechanical lockout arrangement. However, if it is desired that any intermediate condition be attained, these arrangements are ineffectual. That is, if a non-linear force deflection characteristic is desired, or if any damping between normal damping and solid lockout is desired, something more than these inflexible devices will be required.

The desideratum, then, is a mechanism having a variable spring constant, variable damping coefficient and additionally a lockout characteristic which will permit the mechanism to "go solid." The present invention fulfills these requirements by utilization of a magnetic fluid within a unique plunger and cylinder arrangement. While the use of such magnetic fluids in shock absorbers is not new, the present invention combines the fluid with a novel configuration to provide a device having greatly improved characteristics.

It is the object of the present invention, therefore, to provide a mechanism which will have not only a linear and non-linear force-deflection characteristic, but also a variable damping coefficient, and additionally a lockout feature which may be actuated at any point within the stroke of the device.

Other objects and many of the attendant advantages of this invention will be readily appreciated as the same becomes better understood by reference to the following detailed description when considered in connection with the accompanying single drawing in which Fig. 1 is a sectional view of the device constituting the present invention.

Briefly, the present invention contemplates a novel plunger and cylinder arrangement in which magnetic fluid is metered through a passageway and subjected to a magnetic field of a solenoid. The effect of the field on the magnetic fluid is such that the effective viscosity of the fluid increases as the strength of the field increases, thereby providing non-linear and variable characteristics that are dependent variables of the current input. As the strength of the field increases to a predetermined value, the magnetic fluid becomes virtually solid so that a lock-out feature is also provided.

Referring now to the drawing in greater detail, Fig. 1 shows the present invention in which a cylinder 12 slidably receives a plunger assembly 14. The cylinder 12 is provided with a bore 16 and an enlarged diameter recess 18 with a beveled shoulder 20 therebetween. Closing one end of the cylinder 12 is an end wall 22 having a threaded concentric aperture 24 therein. The exterior of the wall 22 is provided with a reduced diameter portion 26 having threads thereon for engagement with a dust cap 28.

The plunger assembly 14 includes a round tube 30 which slidably engages the enlarged diameter recess 18 of the cylinder 12. The end of the tube 30 extending innermost into the cylinder 12 is of reduced diameter to define a beveled shoulder 31 and slidably engages the cylinder bore 16. Located in the walls of the cylinder 12 and the tube 30 are appropriate guide rings and seals, 32 and 34, respectively.

Closing the reduced end of the tube 30 is a wall 36 having a concentric aperture 38 extending therethrough. Passing through the aperture 38 and in slidable engagement therewith is a stud 40, one end of which threadedly engages the aperture 24 in the end wall 22 of the cylinder 12, a seal 41 being provided in the end wall 22. Formed on the opposite end of the stud 40 is a circular concentric head 42 which is in slidable engagement with the inner wall of the tube 30. An appropriate recess is provided in the periphery of the head 42 to accommodate a seal 44. It will be seen that when the stud 40 is secured in engagement with the end wall 22, the plunger assembly 14 is telescopically engageable between the walls of the cylinder 12 and the stud 40 to define a pair of expansible chambers 46 and 48. This movement is limited in one direction by engagement of the beveled shoulders 20 and 31, and in the other direction by a shoulder 50 on the stud 40 which is engageable with the inner surface of the tube wall 36.

Contained in the chambers 46 and 48 is a magnetic fluid in which iron particles are suspended in a silicone fluid. A 50 percent mixture, by volume, of particles of 8 microns average diameter in silicone fluid such as Dow Corning No. 200 or 550, has been found to be very satisfactory.

A passageway 52 is provided in the stud 40 to communicate the chambers 46 and 48 and comprises a longitudinal bore 54 and a pair of radial bores 56. The longitudinal bore 54 is closed by a sealed terminal assembly 58 having an electrical connector 59 extending therethrough.

Positioned within the tube 30 and around the stud 40 is a coil 62 for inducing a magnetic field on the fluid, especially that fluid that is in the passageway 52 and chamber 48. One lead (not shown) of the coil 62 is grounded to the stud 40 while another lead 63 passes through the passageway 52 and is secured to the connector 59. Another lead 64 is secured to the other end of the connector 59 and coupled to a source of power (not shown) through a grommet 65 in an end cover 66 which threadably engages and closes the large end of the tube 30. Formed within the tube 30 between the cover 66 and the head 42 is an air space 68 in which the lead 64 is coiled to allow for relative motion between the tube 30 and the stud 40. A gasket 70 is provided between the cover 66 and the end of the tube 30 for sealing purposes.

As an alternate or as a supplemental magnetizing means, a second coil 72 may be provided around the periphery of the cylinder 12 if a more intense and larger field is desired, although it is readily seen that the device will lose its compactness by the addition of such a relatively massive item. However, where space is not an important consideration, the coil 72 will exert broader influence upon the magnetic fluid and will affect more of the fluid, including that portion in the chamber 46. Appropriate leads are provided to couple the coil 72 to a source of power (not shown).

In operation, it is seen that the amount of damping depends on the amount of fluid which flows through the passageway 52. By varying the effective viscosity of the fluid in the passageway 52, it is possible to attain control over the flow therein. Therefore, by controlling the strength of the magnetic field induced by the coils 62 and/or 72, control may be obtained over the amount of damping accomplished by the device. Thus the damping factor is made a dependent variable of the current input to the coils.

The lockout characteristic is obtained by inducing a magnetic field of such strength that the magnetic fluid in the passageway 52 is virtually solidified, thereby providing a practically solid mounting. It will be recognized that while the fluid in the passageway 52 (and also the fluid in the chamber 48) is influenced by the magnetic field, the fluid in the chamber 46 is only mildly influenced thereby. The effect of this is that while the damping may be varied, and indeed even be eliminated altogether by the lockout characteristic, the device will still have a spring characteristic by virtue of a small volume of fluid being under compression in the chamber 46. This feature will thus additionally provide a liquid spring with practically any amount of preload varying from the built-in preload to a maximum as permitted by the compressibility of the fluid when the system is fully energized. But a more important feature of this device is that the damping coefficient of the resulting liquid spring may be varied by varying the current to the solenoid coils 62 and 72, especially to the latter.

In order that the flux path be directed substantially along the magnetic fluid in the passageway 52, the material of the cylinder 12, the stud 40, and the tube 30 should be relatively non-magnetic. In this manner, the magnetic field will have a greater effect on the viscosity of the fluid in the passageway 52.

Obviously many modifications and variations of the present invention are possible in the light of the above teachings. It is therefore to be understood that within the scope of the appended claims, the invention may be practiced otherwise than as specifically described.

What is claimed is:

1. An improvement in a unitary liquid spring and shock absorber device, comprising, a hollow cylinder including an end wall and a concentric shaft secured to said end wall within said cylinder, a concentric circular head on the free end of said shaft and having its periphery positioned in spaced relationship to the inner wall of said cylinder, a hollow cylindrical plunger slidably engageable in said cylinder, and having one of its ends exposed, said plunger also being positioned around said head and slidably engageable therewith, a cap closing said exposed end of said plunger to define a first chamber therein between said head and said cap, said plunger also having its other end closed by an inwardly depending annular flange the end of which is slidably engageable with said shaft to define a second and third chamber, said second chamber being within said plunger and between said flange and said head, said third chamber being within said cylinder and between said flange and said end wall of said cylinder, a magnetic fluid in said second and third chambers, a passageway in said shaft and communicating said second and third chambers, a coil in said plunger and around the portion of said shaft having said passageway therein, means for applying variable electrical energy to said coil to produce a magnetic field therearound, and means for applying force to said plunger to cause relative motion between said plunger and said cylinder, whereby the effective viscosity of said fluid may be varied by varying the strength of said magnetic field, thereby providing control of said relative motion, said control ranging from normal damping to solid lockout.

2. The apparatus as recited in claim 1 with additionally a second coil around the periphery of said cylinder, and a second means for applying electrical energy thereto for inducing a magnetic field therearound.

3. In a unitary liquid spring and shock absorber device having a hollow cylinder and a hollow plunger telescopingly arranged with respect to each other, said cylinder having an end wall and a shaft secured concentrically within said cylinder, said shaft having a circular head secured concentrically thereto, the peripheral wall of said head being slidably engageable with the inner wall of said plunger, said plunger also having a cap closing the exposed end of said plunger; the combination therewith of an improvement, comprising, an inwardly depending annular flange on the other end of said plunger, the end of said flange being in slidable engagement with said shaft to define a first and a second chamber, said first chamber being within said plunger and between said flange and said head, said second chamber being within said cylinder and between said flange and said end wall of said cylinder, a magnetic fluid in said first and second chambers, a substantially longitudinal passageway in said shaft and communicating said first and second chambers, a coil in said plunger and surrounding said shaft and said passageway, means for applying variable electrical energy to said coil for inducing a magnetic field therearound, and means for applying force to said plunger for causing a relative motion between said plunger and cylinder, whereby the effective viscosity of said magnetic fluid may be varied by varying the strength of said magnetic field to thereby provide control of said relative motion.

4. The apparatus as recited in claim 3 with additionally a second coil positioned around the periphery of said hollow cylinder, and a second means for applying electrical energy thereto for inducing a magnetic field therearound.

References Cited in the file of this patent

UNITED STATES PATENTS

| | | |
|---|---|---|
| 2,346,667 | Dowty | Apr. 18, 1944 |
| 2,580,825 | Orloff | Jan. 1, 1952 |
| 2,661,596 | Winslow | Dec. 8, 1953 |
| 2,667,237 | Rabinow | Jan. 26, 1954 |
| 2,909,368 | Taylor | Oct. 20, 1959 |